United States Patent [19]

Török

[11] 4,348,605

[45] Sep. 7, 1982

[54] ELECTRICAL RELUCTANCE MACHINE

[75] Inventor: Vilmos Török, Lidingö, Sweden

[73] Assignee: ASEA Aktiebolag, Västerås, Sweden

[21] Appl. No.: 131,590

[22] Filed: Mar. 19, 1980

[30] Foreign Application Priority Data

Mar. 30, 1979 [SE] Sweden ................................ 7902845

[51] Int. Cl.³ ............................................ H02K 19/06
[52] U.S. Cl. ...................................... 310/168; 310/155; 310/181; 318/701
[58] Field of Search ............... 310/181, 162, 163, 168, 310/154, 155; 318/701

[56] References Cited

U.S. PATENT DOCUMENTS

| | | | |
|---|---|---|---|
| 2,816,240 | 12/1957 | Zimmernias | 310/181 X |
| 2,968,755 | 1/1961 | Baermann | 310/163 X |
| 3,280,398 | 10/1966 | Marie | 318/701 |
| 3,862,445 | 1/1975 | Volkrodt | 310/181 X |
| 3,995,203 | 11/1976 | Török | 310/163 X |
| 4,039,908 | 8/1977 | Maeder | 318/701 |
| 4,260,926 | 4/1981 | Jarret et al. | 310/163 X |

Primary Examiner—Donovan F. Duggan
Attorney, Agent, or Firm—Pollock, Vande Sande & Priddy

[57] ABSTRACT

A reluctance machine comprises a rotor having a plurality of unwound salient rotor poles, and a stator with an even number of mutually equal groups of salient stator poles evenly distributed around the inner circumference of the stator unit, each stator pole being surrounded by a respective working coil. The stator poles belonging to the same group have the same polarity and also the same premagnetization. The polarity is determined by the working coils being distributed between at least two working windings which are each provided with a rectifying means. Between two stator poles, whose working coils belong to one and the same working winding, there is at least one stator pole which supports a working coil belonging to some other working winding.

14 Claims, 23 Drawing Figures

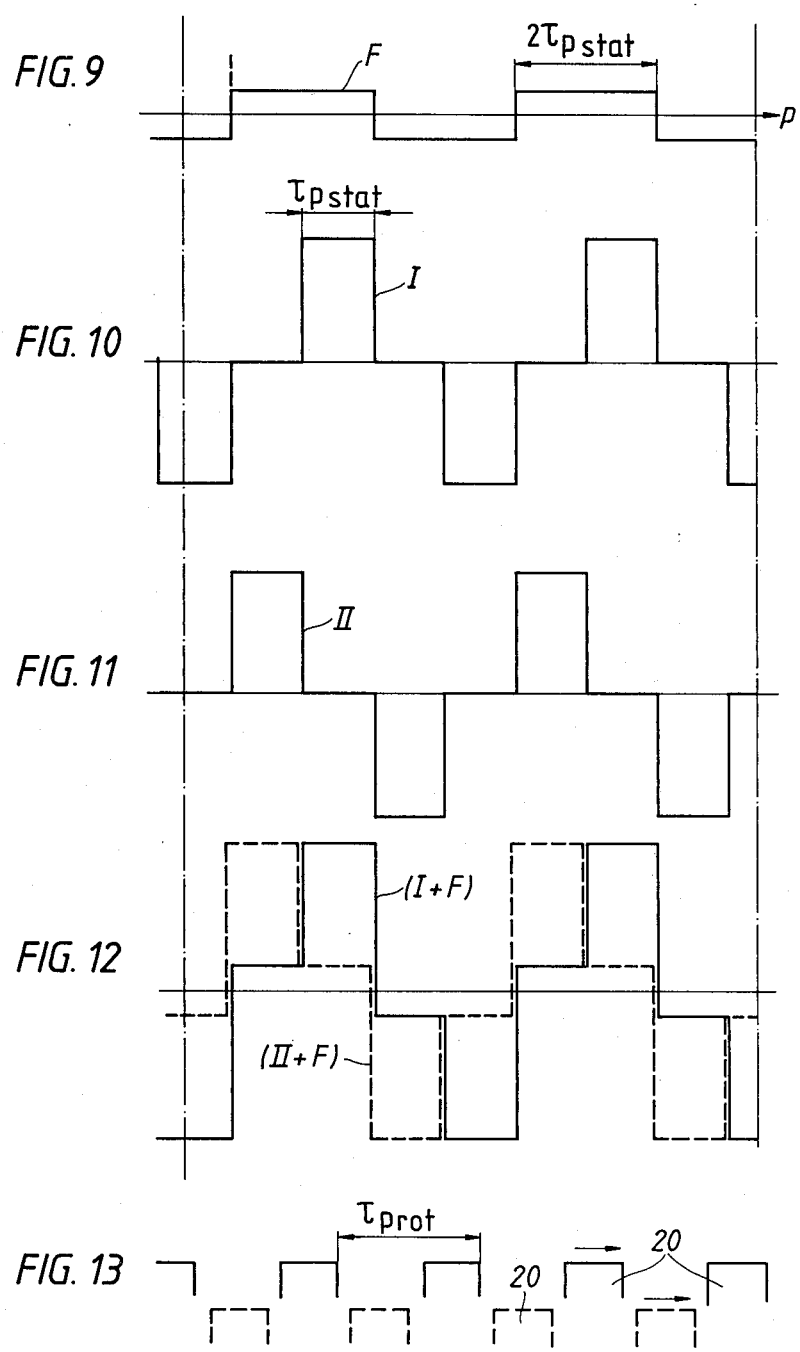

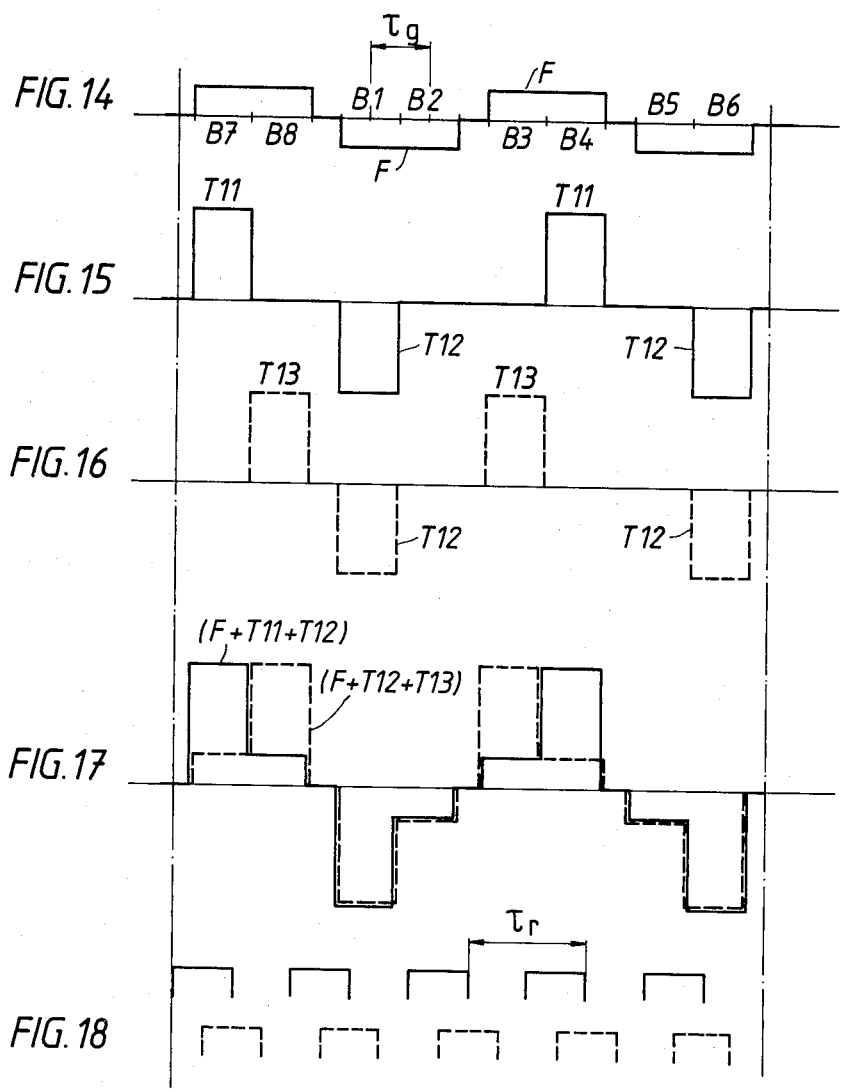

ELECTRICAL RELUCTANCE MACHINE

TECHNICAL FIELD

This invention relates to an electrical reluctance machine of the kind comprising at least one stator unit with an even number of mutually equal groups of salient stator poles, said groups being evenly distributed around the inner circumference of the stator unit, means for premagnetizing said stator poles with one and the same polarity within each of said stator pole groups, but with differing polarity from group to group around the entire stator circumference, said stator pole groups supporting a plurality of working coils, which are distributed between at least two working windings provided with individual rectifying means, said rectifying means being arranged to establish the current directions and thus the directions of magnetization of said working coils, and a rotor shaft supporting at least one rotor within said stator unit, said rotor having a plurality of salient rotor poles made with substantially the same width as the stator poles.

BACKGROUND ART

A machine of the kind referred to is known from U.S. Pat. No. 3,995,203. This known machine is constructed and combined with rectifier equipment in such a manner that the machine may function, with acceptable efficiency, either as a generator or a motor. A relatively simple rectifier equipment is used, and the material utilization of the reluctance machine need not differ much from that usually obtained with rotary electrical machines.

One condition for obtaining these advantageous properties in the known machine is that only double-pole coils are used. This involves complicated design work since the coils must be manufactured with specially shaped coil ends due to the fact that the coil ends of each coil must be constructed with regard to their position in relation to the adjacent, intersecting coil ends. Furthermore, double-pole coils are unfavourable from the point of view of operation and maintenance, since replacement of a defective coil by a new coil requires, in 50 percent of the cases, removal of at least two additional coils.

In the aforesaid U.S. Patent it is also mentioned that two single-pole coils arranged on adjacent poles may replace one double-pole coil if they are interconnected in such a way that the surrounded poles are excited in one and the same direction, i.e. so that one pair of single-pole coils becomes fully equivalent to a double-pole coil as regards the excitation effect.

However, the use of such single-pole coils would result in coil sides having opposite axial current directions in the pole gap between poles excited in the same direction. Such coil sides are of no use whatsoever since one will cancel the magnetic effect of the other. The result is a low utilization of the conductor material of the reluctance machine and at the same time an increase of the losses of the machine, because of the electrical energy which is transformed into heat in the useless, surplus conductor material.

Furthermore, the known machine requires the use of a series winding, since the working winding and the premagnetizing winding act with opposite directions in half of the poles of a working winding, and since it is desired to have a pre-magnetization in these poles which is dependent on the current intensity of the working winding in such a way that the resultant number of ampere turns of the pole may become very small but never changes direction. This series winding is an additional complication from the point of view of manufacture.

The present invention aims to provide a reluctance machine of the kind referred to in which the above-mentioned drawbacks are eliminated. In particular the invention aims to provide a reluctance machine in which the commutating conditions of the rectifying means are just as favourable as in the known machine, and in which largely the same simple principle of current supply is employed, but in which the windings of the reluctance machine are constructed in such a way that simplified manufacture and maintenance are achieved while maintaining the degree of material utilization.

DISCLOSURE OF INVENTION

According to the invention, in an electrical reluctance machine of the kind referred to, each of said working coils surrounds one stator pole only, the magnetization direction of each of said working coils always coincides with the direction of the pre-magnetization applied to the corresponding stator pole, and two stator poles whose working coils belong to one and the same working windings are always separated from each other in the circumferential direction of the stator by at least one intermediate stator pole which supports a working coil belonging to a different working winding.

BRIEF DESCRIPTION OF DRAWINGS

The invention will now be described, by way of example, with reference to the accompanying schematic drawings, in which FIGS. 9, 10, 11 and 12 are graphs showing how the magnetomotive force (m.m.f.) varies in circumferential direction around an inner circular cylindrical surface, lying in the air gap, when the machine shown in FIGS. 1 and 3 is operated as a motor, FIG. 13 is a diagram showing two different rotor positions, FIGS. 14, 15, 16, 17 and 18 are diagrams similar to FIGS. 9, 10, 11, 12 and 13, respectively, for the machine of FIGS. 4 and 5 when operated as a motor.

DESCRIPTION OF PREFERRED EMBODIMENTS

Figure 1:
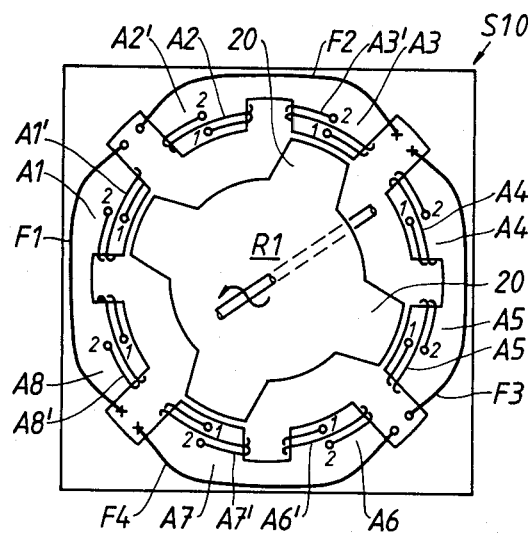
FIG. 1 is an end view of a first embodiment of a reluctance machine in accordance with the invention, which can be used alone or in combination with a similar machine shown in FIG. 2.

In FIG. 1, the reference S10 generally designates a stator unit which is composed of a plurality of laminations made of a magnetic material and has eight salient poles A1–A8. The stator unit S10 surrounds a rotor R1 with four salient poles 20, which are evenly distributed around the circumference of the rotor, the rotor poles being made with radially outwardly decreasing cross-section. In the position of the rotor shown, each rotor pole 20 confronts a stator pole, and it will be seen that the circumferential extent of each rotor pole at the air gap is substantially equal to the corresponding dimension of each stator pole. The stator poles A1–A8 are provided with respective working coils A1'–A8'. In addition, the stator unit is provided with four mutually equal pre-magnetizing coils F1, F2, F3 and F4, which are connected in series with each other and connected to a d.c. source (not shown), the voltage of which need not be controllable. Each premagnetizing coil surrounds one group of stator poles, positioned one after the other in the circumferential direction, the groups being pre-magnetized with varying polarity from group to group around the entire stator circumference.

Figure 3:
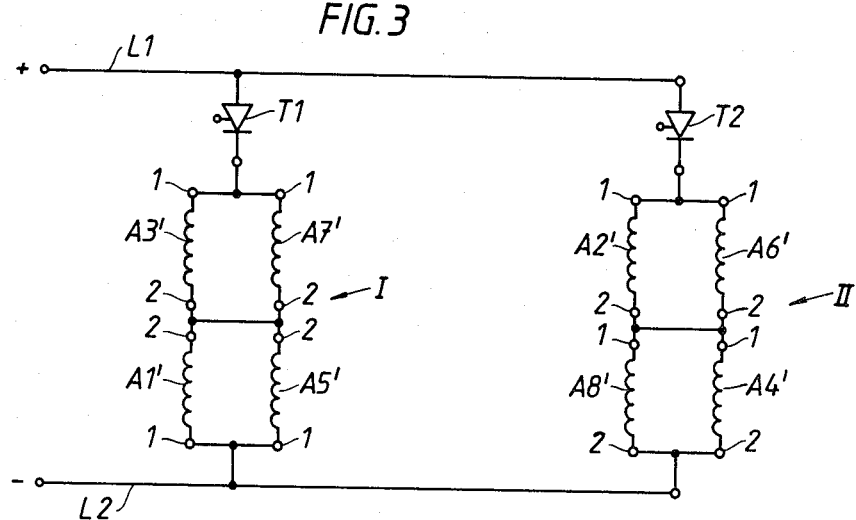
FIG. 3 is a circuit diagram of the working windings of the machine shown in FIG. 1.

All the working coils A1'–A8' are the same as regards their design and location on the respective stator poles and all of them have a radially inner end point 1 and a radially outer end point 2. As shown in FIG. 3, the working coils A1'–A8' are interconnected to form two working windings I and II, which are connected via individual controlled rectifiers T1 and T2, respectively, to the bars L1 and L2 of a d.c. network. The current direction in the working coils is determined in such a manner by the controlled rectifiers T1 and T2 that the direction of magnetization produced by the working coils of each pair of immediately adjacently positioned stator poles provided with a common pre-magnetization coil is the same as that of the pre-magnetizing coil. Each stator pole which is provided with a working coil belonging to the working winding I, has on each side an immediately adjacent stator pole whose working coil belongs to the working winding II; or in other words, between two stator poles whose working coils belong to one working winding there is a stator pole whose working coil belongs to the other working winding. The controlled rectifiers T1 and T2 are arranged in a known manner, for example by means of the rotor angle transducer described in the aforesaid U.S. Pat. No. 3,995,203, to be supplied alternately with firing pulses. In motor operation each working winding is supplied with current only during the interval when the corresponding stator poles are in some "drawing-in" position with respect to the rotor poles (i.e. in a position of mutual attraction), and during generator operation the controlled rectifiers T1 and T2 prevent current from flowing in the drawing-in positions, but permit current flowing in the working winding in "drawing-out" positions.

In FIG. 9, the curve F shows the distribution around the stator circumference of the pre-magnetizing m.m.f. that is obtained by means of the series-connected pre-magnetizing windings F1, F2, F3 and F4, the pole pitch of the stator being designated $\tau p_{stat}$. FIGS. 10 and 11 show similar curves for the working windings I and II, respectively. The working winding that carries current at a given time provides an m.m.f. either according to FIG. 10 or FIG. 11. By superposition, either the unbroken curve or the broken curve in FIG. 12 is obtained. The uppermost row of the rotor poles 20 of the rotor R1 indicated in FIG. 13 are in their drawing-in position with respect to the unbroken m.m.f. curve in FIG. 12. After a rotor motion that corresponds to a stator pole pitch, the poles of the rotor R1 will assume a position corresponding to the dash lined pole symbols in FIG. 13, i.e. in a drawing-in position with respect to the dash-lined curve in FIG. 12.

By comparison with the corresponding curves of the aforesaid U.S. patent, it is seen that the machine shown in FIGS. 1 and 3 operates in the same way as that described in the aforesaid U.S. patent, in so far as the displacement of flux that is required, each time deactivation of one working winding and activation of the other takes place, is exactly the same for both machines. This means that the commutating conditions for the alternately operating controlled rectifiers are just as favourable with the machine shown in FIGS. 1 and 3 as with the machine described in the aforesaid U.S. patent.

When the machine operates as a generator, each of the controlled rectifiers T1 and T2 may be replaced with a diode or a group of diodes.

Figure 2:
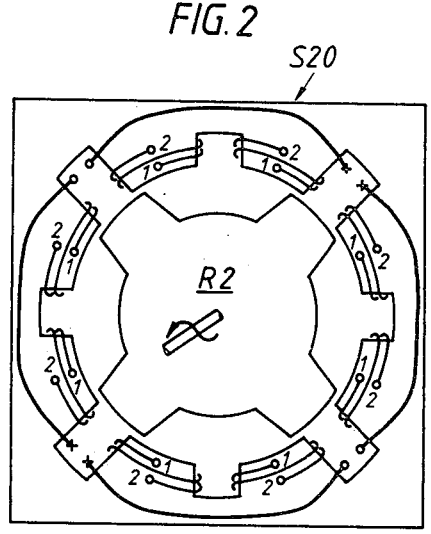

In a known manner the machine unit shown in FIG. 1 may be combined with the one shown in FIG. 2, in which the stator unit S20 and the rotor R2 are designed in the same way as the stator unit S1 and the rotor R1, respectively, the two working windings of the stator S20 being each provided with a mains-connected controlled rectifier. The rotors R1 and R2 are then fixed to one and the same rotor shaft, but with different angular positions. A motor is then obtained which is able to start at all angular positions, which is not the case if the machine shown in FIGS. 1 and 3 only is used. Instead of two equal stator units S10 and S20, a stator unit may be used which constitutes a combination of these, four pre-magnetizing coils then being used instead of eight, these being more than twice as long as the ones shown in FIG. 1.

Figure 4:
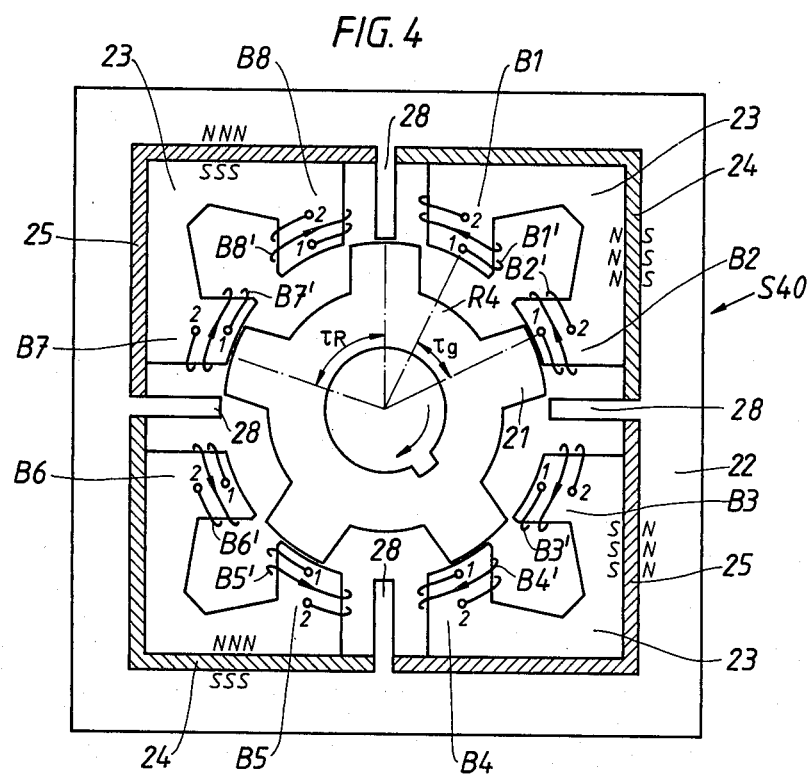
FIG. 4 is an end view of a second embodiment of a reluctance machine in accordance with the invention.

The reluctance machine shown in FIG. 4 has a rotor R4 which is composed of laminations of magnetic material arranged axially one after the other. The rotor R4 has five salient poles 21 and is surrounded by a stator unit S40 which comprises a stator ring 22 in the form of a laminated square frame of soft-magnetic material. The four corners of the frame are each provided with a pole group body 23, made of laminated soft-magnetic material, each having two salient stator poles B1-B2, B3-B4, B5-B6 and B7-B8, respectively, which are provided with a working coil B1'-B8', respectively. The gaps between the pole group bodies 23 are each provided with a flux-balancing element 28 which is made of soft-magnetic material and arranged in direct magnetic connection with the stator ring 22. The pole pitch of the poles in each pole group body 23 is designated $\tau g$ and the pole pitch of the rotor is designated $\tau R$. $\tau g$ is half of $\tau R$ in the case illustrated, and in any case a value which is in the range of from 0.4 $\tau R$ to 0.6 $\tau R$. The main poles of the stator unit, i.e. the poles provided with working coils are each pre-magnetized by means of a separate permanent-magnetic spacer 24 or 25, arranged between a corresponding pole group body 23 and the stator ring 22, these spacers having an L-shaped cross-section and having substantially the same axial length as the stator ring. Each spacer 24 has a north pole at surfaces facing the pole group body and a south pole at surfaces abutting the stator ring, whereas each spacer 25 is polarized in the opposite manner. In each of the working coils B1'–B8' the end points are designated 1 and 2, and current flowing from point 1 to point 2 gives a north pole, and current flowing from point 2 to point 1 gives a south pole.

Figure 5:
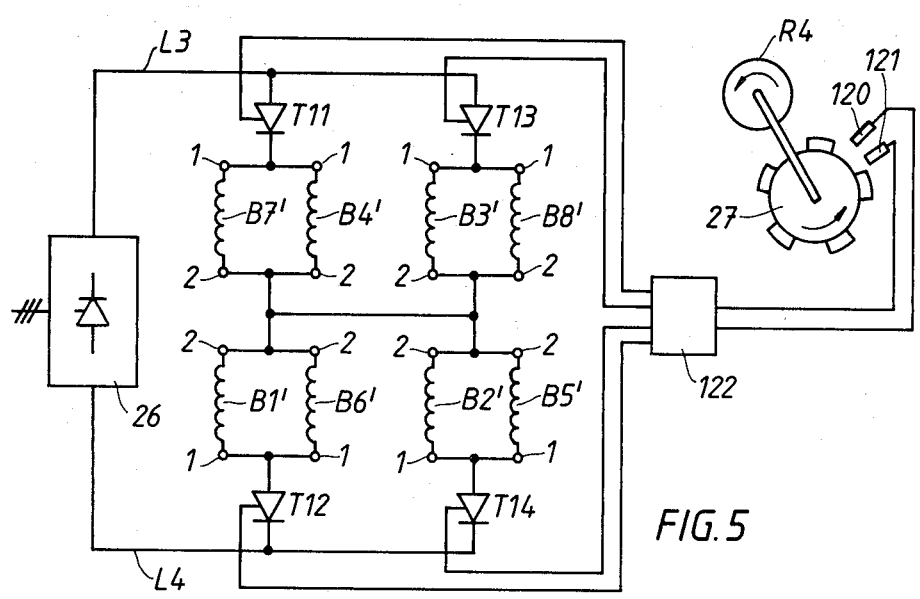
FIG. 5 is a circuit diagram of the working windings of the machine of FIG. 4.

From FIG. 5 it is clear that the working coils B1'–B8' are adapted to form four working windings, which are each provided with a controlled rectifier T11, T12, T13, or T14. Two parallel-connected working coils having the same magnetization direction are included in each working winding. The working windings together with the associated controlled rectifiers, form two parallel groups which are connected in series between two d.c. bars L3 and L4. The d.c. bars L3 and L4 are connected to a d.c. source 26 having variable voltage. Working coils arranged on the same pole group body 23 always have the same magnetization direction. namely that of the pre-magnetization of the pole group body.

Within each of the working windings (B7', B4'), (B1', B6'), B3', B8'), (B2', B5'), the coils are equal regarding the direction of magnetization and in other respects. Two coils belonging to one and the same working winding, for example the coils B1' and B6', are always separated in the circumferential direction by at least two intermediate coils which do not belong to this working winding.

The rotor R4 is provided with a position transducer comprising a rotary member 27 and two stationary members 120 and 121 connected to a logic device 122, from which firing pulses to the controlled rectifiers emanate. The position transducer may, for example, be designed in a similar manner to the one described in the aforesaid U.S. patent. The controlled rectifiers then become conducting in the following order: T11, T12, T13, T14, the angle between each firing pulse being $360/(5\times 4)=18°$.

During clockwise rotation (as viewed in FIG. 4) and with the rotor position shown in FIG. 4, two of the rotor poles, namely those which are nearest the stator poles B4 and B7, are in a drawing-in position, whereas the two rotor poles which overlap the stator poles B5 and B2 are in the process of moving away from these stator poles. Since the magnetic flux is approximately equally great at all four overlapping points, it is easy to believe that the resultant torque would be almost equal to zero. This, however, is not the case, since the m.m.f. in the overlapping zones between a stator pole and a rotor pole to a great extent determines the torque that the stator pole exerts on the rotor pole.

There are rotor positions where the sum of the fluxes from the south poles of the stator unit is not equal to the sum of the fluxes from the north poles of the stator unit. The flux-balancing elements 28, which are made of soft-magnetic material, abducts the difference between north pole and south pole fluxes, thus preventing magnetic leakage flux in the axial direction.

The machine shown in FIG. 4 may be designed with four pre-magnetizing coils (not shown) connected to a d.c. source, instead of the four L-shaped permanent-magnetic spacers 24 and 25. The pre-magnetizing coils are then arranged to surround one pole group 23 each, thus giving a pre-magnetization according to FIG. 14.

Figure 6:
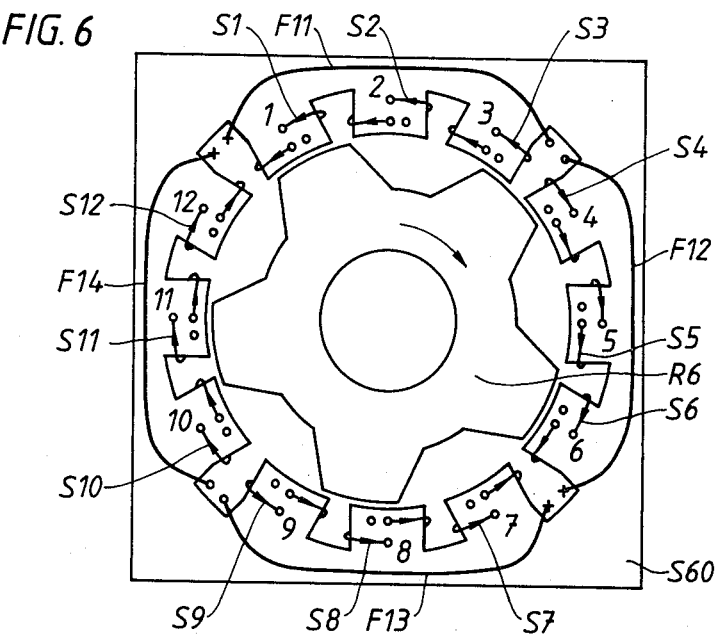
FIG. 6 is an end view of a third embodiment of a reluctance machine in accordance with the invention.
Figure 7:
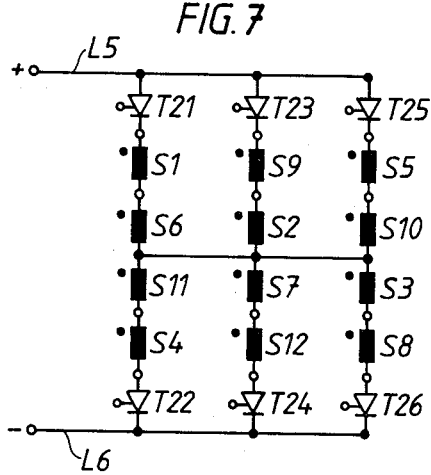
FIGS. 7 and 8 are circuit diagrams of two different ways in which the working coils of the machine shown in FIG. 6 can be arranged to form a plurality of working windings.

The machine shown in FIG. 6 has a rotor R6, which is surrounded by a stator S60. The rotor has five salient poles of soft-magnetic material and, like the rotors described above, it has no rotor winding. The stator S60 has twelve salient poles which are numbered from 1 to 12 in FIG. 6. Each of the stator poles is provided with a respective working coil S1–S12, which are arranged to form six working windings (S1, S6), (S1, S4), (S9, S2), (S7, S12), (S5, S10), (S3, S8). Each of these windings is provided with a controlled rectifier T21, T22, T23, T24, T25, T26, respectively, and, as shown in FIG. 7, connected to two d.c. bars L5 and L6, which are supplied from a d.c. source (not shown), preferably one delivering a variable voltage. The rectifier equipment consisting of the thyristors mentioned above is preferably constituted by a standard 3-phase rectifier module. In addition to the working windings, the stator S60 supports four pre-magnetizing coils F11, F12, F13, F14, arranged circumferentially one after the other, each of these coils surrounding three corresponding stator poles, the magnetization directions of which stator poles are the same as the magnetization direction of the associated pre-magnetizing coil. Two coils belonging to the same working winding, for example coils S1 and S6, are always separated in the circumferential direction by at least four intermediate coils which do not belong to this working winding.

The controlled rectifiers are made conducting by means of a rotor angle transducer (not shown) in the following order: T21, T22, T23, T24, T25, T26, the angle between each firing pulse being $360/(5\times 6)=12°$. Upon each firing pulse, a commutation takes place, one of two current-carrying rectifiers then becoming non-conducting and being replaced by another.

Figure 19:
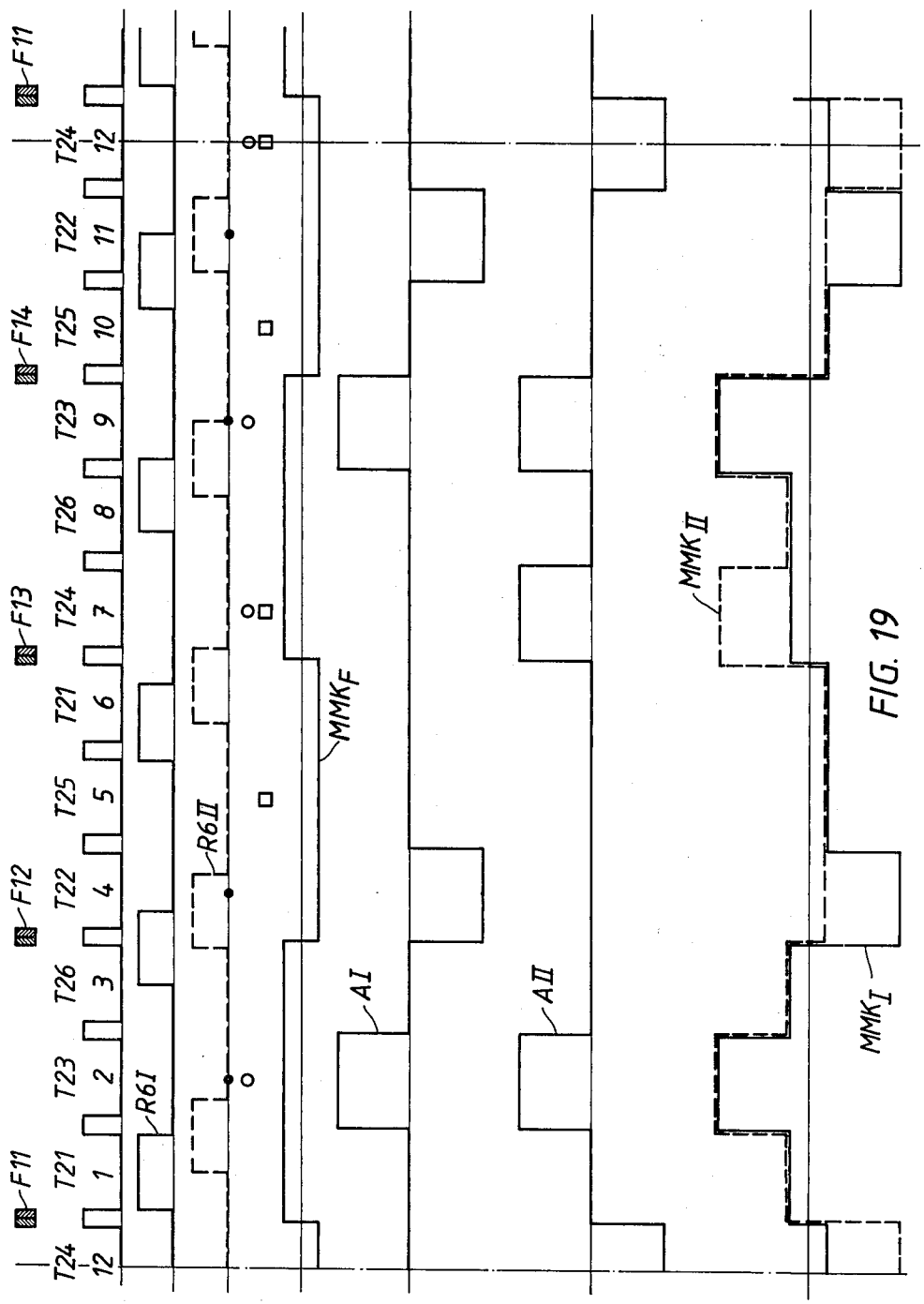
FIG. 19 is a set of diagrams showing two different rotor positions with corresponding resultant m.m.f. curves for a machine designed according to FIGS. 6 and 7, FIGS. 20 and 21 are end views of reluctance machines according to fourth and fifth embodiments, respectively, in accordance with the invention.

FIG. 19 illustrates part of the process during motor operation of the reluctance machine shown in FIG. 6, the pre-magnetizing coils and the stator poles being suggested at the top of FIG. 19. The m.m.f. curve for the premagnetizing coils is shown somewhat below and designated $MMK_F$.

The curves $R6_I$ and $R6_{II}$ suggest two different rotor positions in relation to the stator poles. The corresponding m.m.f.'s, generated by the working windings, are shown by the curves AI and AII, and the corresponding resulting m.m.f. curves are shown as an unbroken curve and a broken curve, respectively, and are designated $MMK_I$ and $MMK_{II}$, respectively. In position I the controlled rectifiers T22 and T23 are current-carrying and the poles 2, 4, 9 and 11 are magnetized. In position II, the rectifiers T23 and T24 are current-carrying and the poles 2, 7, 9 and 12 are magnetized. The symbols • in FIG. 19 indicate the stator poles whose coils carry working current at the rotor position $R6_I$. The symbols o indicate the stator poles whose coils carry working current at the rotor position $R6_{II}$, and the symbols □ indicate stator poles whose coils carry current at a rotor position following shortly after the position indicated by the curve $R6_{II}$.

Figure 8:
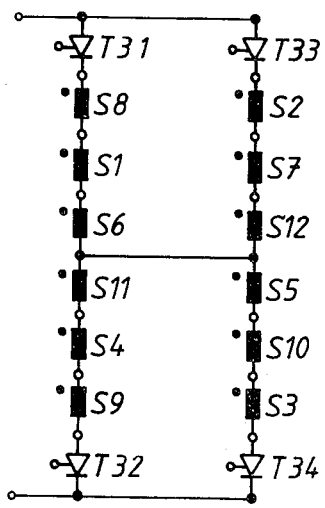

Alternatively, the working coils in the machine shown in FIG. 6 may be connected together in such a way that they form four working windings, each of which is provided with a corresponding controlled rectifier, namely one of the rectifiers T31, T32, T33 and T34, as shown in FIG. 8. In this case, the angle between each firing pulse is $360/(5\times 4)=18°$.

Figure 20:
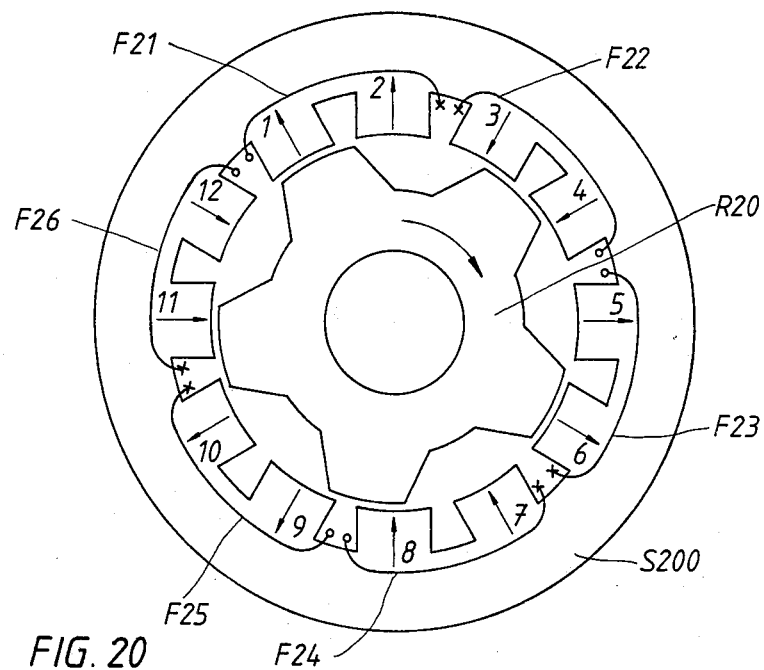

The reluctance machine shown in FIG. 20 has a stator unit S200 and a rotor R20. The stator poles are numbered from 1 to 12, and each stator pole is provided with a corresponding working coil (not shown). Arrows indicate the direction of magnetization in each stator pole when current is permitted to flow through the corresponding working coil. The stator unit S200 is provided with six pre-magnetizing windings F21, F22, F23, F24, F25 and F26, which magnetize the stator poles in directions coinciding with the magnetization given by the working coils.

Figure 22:
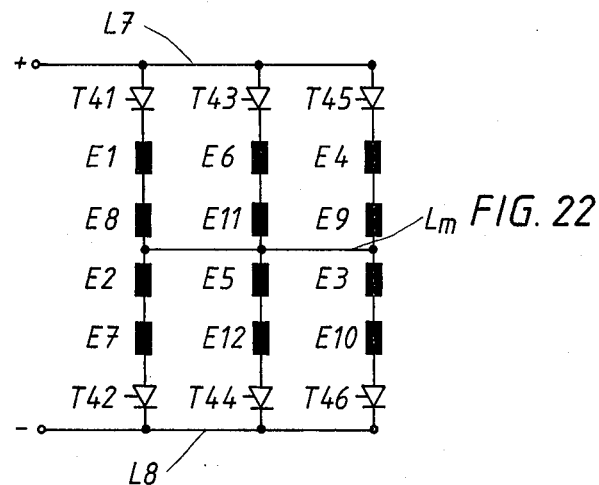
FIGS. 22 and 23 show how the working coils of the machines shown in FIGS. 20 and 21, respectively, are connected to constitute a plurality of working windings.

In FIG. 22, the working coil of stator pole number 1 is designated E1, the working coil of stator pole number 2 is designated E2, and so on. Each working winding comprises two working coils which, together with a respective controlled rectifier T41–T46, are series-connected between a d.c. bar L7 or L8 and a middle bar $L_m$. The controlled rectifiers are caused to become conducting by means of a rotor angle transducer (not shown) in the following sequence: T41, T42, T43, T44, T45, T46, the angle between each firing pulse being $360/(5\times 6)=12°$.

Figure 21:
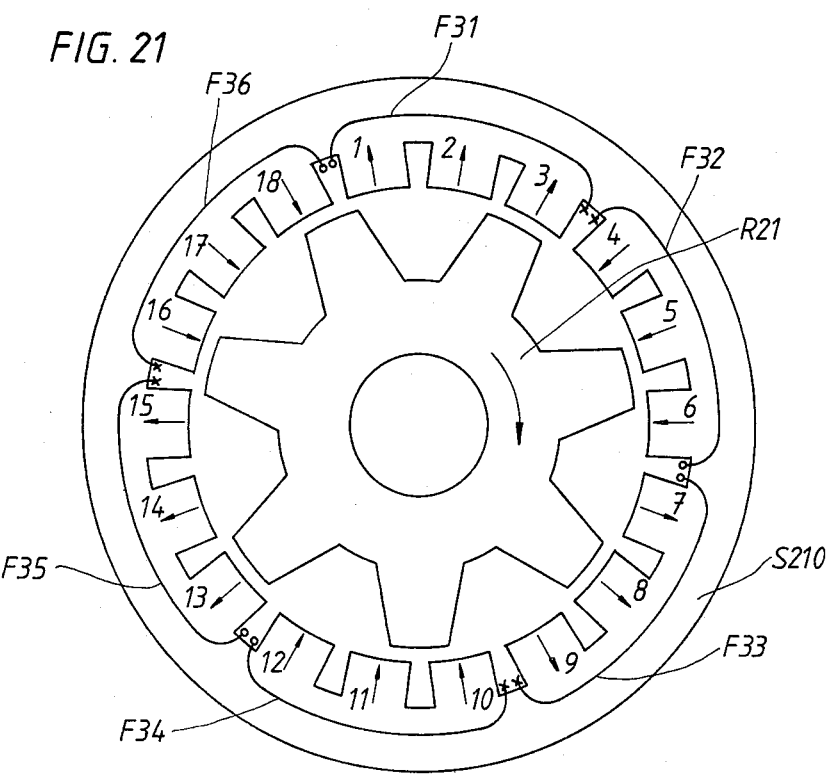

The reluctance machine shown in FIG. 21 comprises a stator unit S210 and a rotor R21. The stator poles are numbered from 1 to 18, and each stator pole is provided with a corresponding working coil (not shown). Arrows indicate the direction of magnetization in each stator pole when current is permitted to flow through the corresponding working coil. The stator unit S210 has six pre-magnetizing windings F31, F32, F33, F34, F35 and F36, which magnetize the stator poles in directions coinciding with the magnetization given by the working coils.

Figure 23:
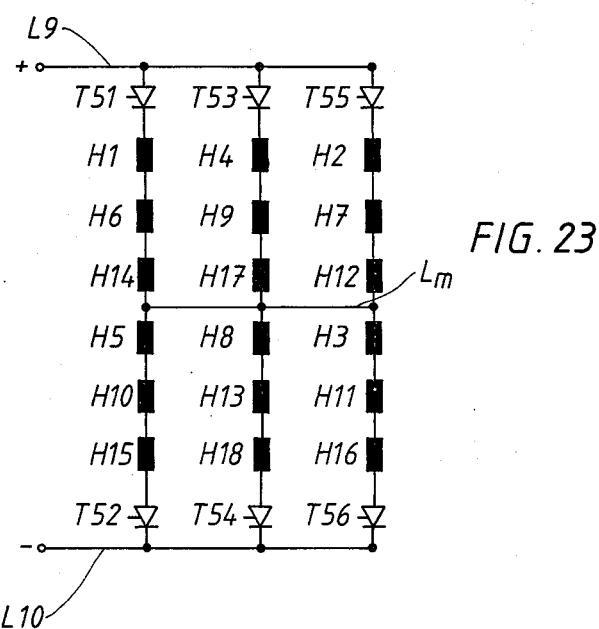

In FIG. 23 the working coil of pole number 1 is designated H1, the coil of pole number 2 is designated H2, and so on. Each working winding comprises three working coils which, together with a respective controlled rectifier T51–T56, are series-connected between a d.c. bar L9 or L10 and a middle bar $L_m$. The controlled rectifiers are caused to become conducting in the sequence T51, T52, T53, T54, T55, T56 by means of a rotor angle transducer (not shown).

In all the embodiments of a reluctance machine according to the invention, the controlled rectifiers may be controlled in motor operation by means of control pulses which are generated by a light source arranged on the rotor, for example a light-emitting diode, when this light source passes a plurality of photo-diodes arranged on a stationary ring arranged coaxially with the rotor. The photo-diodes are evenly distributed around the circumference of the ring with a mutual angular distance corresponding to the angular distance between each firing pulse. Each controlled rectifier is connected to a number of photo-diodes which is equal to the number of rotor poles, and these photo-diodes are distributed at a mutual distance which is equal to the rotor pole pitch.

Instead of using a relatively great number of transducers, for example photo-diodes, in the manner described above, it is possible to use special transducer forks, available on the market. The fork has two arms, each arranged on a corresponding side of a rotating disk, one fork arm supporting a light-emitting diode, the other a photo-diode. The disk is perforated to give optical contact between cooperating diodes at certain angular positions. In many cases, the number of transducers may then be reduced to less than one transducer for each controlled rectifier.

For all the reluctance machines described above, the rule applies that the number of stator and rotor poles may be increased by multiplying the number of stator pole groups and the number of rotor poles by one and the same integer, while maintaining the number of stator poles per stator pole group.

What is claimed is:

1. An electrical reluctance machine comprising at least one stator unit with an even number of mutually equal groups of salient stator poles, said groups being evenly distributed around the inner circumference of the stator unit, means for pre-magnetizing said stator poles with one and the same polarity within each of said stator pole groups, but with differing polarity from group to group around the entire stator circumference, said stator pole groups supporting a plurality of working coils, which are distributed between at least two working windings provided with individual rectifying means, said rectifying means being arranged to establish the current directions and thus the directions of magnetization of said working coils, and a rotor shaft supporting at least one rotor within said stator unit, said rotor having a plurality of salient rotor poles having substantially the same width as the stator poles, in which each of said working coils surrounds one stator pole only, the magnetization direction of each of said working coils always coincides with the direction of the pre-magnetization applied to the corresponding stator pole, and two stator poles whose working coils belong to one and the same working winding are always separated from each other in the circumferential direction of the stator by at least one intermediate stator pole which supports a working coil belonging to a different working winding.

2. A reluctance machine according to claim 1, in which said stator pole groups are pre-magnetized by means of individual permanent-magnetic spacers arranged between a stator pole group and a stator ring.

3. A reluctance machine according to claim 1, in which the pole pitch of the poles within each stator pole group is equal to the rotor pole pitch divided by an integer.

4. A reluctance machine according to claim 3, in which said integer is two, and the number of stator poles in said stator pole group is two.

5. A reluctance machine according to claim 1, in which the number of said stator pole groups in each stator unit is 4k, where k is an integer $\geq 1$.

6. A reluctance machine according to claim 5, in which the number of rotor poles is equal to the number of said stator pole groups.

7. A reluctance machine according to claim 5, in which the number of said rotor poles is 5/4 times the number of said stator pole groups.

8. A reluctance machine according to claim 7, comprising four working windings with two parallel-connected working coils in each winding, each working winding being provided with a series-connected rectifier device.

9. A reluctance machine according to claim 7, in which a plurality of gaps between said stator pole groups are each provided with a flux-balancing element in the form of a radially-directed, magnetically-conducting projection from the stator unit.

10. A reluctance machine according to claim 1, in which the number of poles in each of said stator pole groups is three, the number of said stator pole groups in each stator unit is 4k, k being an integer $\geq 1$, and the number of said rotor poles is 5/4 times the number of said stator pole groups.

11. A reluctance machine according to claim 10, comprising six working windings with two series-connected working coils in each working winding.

12. A reluctance machine according to claim 10, comprising four working windings with three series-connected working coils in each winding.

13. A reluctance machine according to claim 1, in which the number of poles in each of said stator pole groups is two, the number of said stator pole groups in each stator unit is 6k, k being an integer $\geq 1$, and the number of rotor poles is 5/6 times the number of said stator pole groups.

14. A reluctance machine according to claim 1, in which the number of poles in each of said stator pole groups is three, the number of said stator pole groups in each stator unit is 6k, k being an integer $\geq 1$, and the number of rotor poles is 7/6 times the number of said stator pole groups.

* * * * *